(12) United States Patent
Otsuka

(10) Patent No.: US 8,033,601 B2
(45) Date of Patent: Oct. 11, 2011

(54) VEHICLE SEAT

(75) Inventor: Taiyo Otsuka, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 275 days.

(21) Appl. No.: 12/435,020

(22) Filed: May 4, 2009

(65) Prior Publication Data
US 2010/0001561 A1    Jan. 7, 2010

(30) Foreign Application Priority Data

Jul. 1, 2008  (JP) ................................. 2008-172437

(51) Int. Cl.
*B60N 2/42*    (2006.01)
(52) U.S. Cl. .................................................. 297/216.12
(58) Field of Classification Search ............. 297/216.12, 297/391, 408
See application file for complete search history.

(56) References Cited

U.S. PATENT DOCUMENTS

| 6,082,817 | A * | 7/2000 | Muller ..................... 297/216.12 |
| 6,631,955 | B2 | 10/2003 | Humer et al. |
| 6,688,697 | B2 * | 2/2004 | Baumann et al. ............. 297/391 |
| 7,070,235 | B2 * | 7/2006 | Schilling et al. ......... 297/216.12 |
| 7,108,320 | B2 * | 9/2006 | Schafer ..................... 297/216.12 |
| 7,195,313 | B2 * | 3/2007 | Hippel et al. ............. 297/216.12 |
| 7,344,191 | B2 * | 3/2008 | Schilling et al. ......... 297/216.12 |
| 7,611,196 | B2 * | 11/2009 | Terada et al. ............. 297/216.12 |
| 7,845,721 | B2 * | 12/2010 | Maeda et al. ............. 297/216.12 |
| 2007/0246989 | A1 * | 10/2007 | Brockman ..................... 297/391 |
| 2009/0315371 | A1 * | 12/2009 | Shimizu et al. .......... 297/216.12 |
| 2010/0109396 | A1 * | 5/2010 | Vitali ....................... 297/216.12 |

FOREIGN PATENT DOCUMENTS

| DE | 19750375 | 5/1998 |
| DE | 10150899 | 3/2003 |
| DE | 10212828 | 6/2003 |

* cited by examiner

*Primary Examiner* — Peter R. Brown
(74) *Attorney, Agent, or Firm* — Greenblum & Bernstein, P.L.C.

(57) ABSTRACT

There is provided a head rest moving mechanism of moving a support portion of a head rest relative to a seat back when a vehicle is subjected to a back collision. The head rest moving mechanism moves the support portion from an initial position to a collision corresponding position in a front upper direction. The head rest moving mechanism includes a base installed at an upper portion of the seat back, link means for linking the support portion and the base, an engaging pin moved integrally with the support portion for operating an attitude of the support portion in accordance with a relative movement thereof, and a guide path slidably engaged with the engaging pin for guiding to slide the engaging pin in accordance with the relative movement of the support portion.

4 Claims, 11 Drawing Sheets

VEHICLE SEAT

This application claims priority to Japanese patent application serial number 2008-172437, the contents of which are incorporated herein by reference.

BACKGROUND OF THE INVENTION

1. Field of the Invention

The present invention relates to a vehicle seat having an active head rest.

2. Description of the Related Art

There is a vehicle seat that adopts an active head rest of moving a support portion of a head rest to a front side and an upper side instantaneously in back collision (back face collision) of a vehicle. An active head rest supports the head of a passenger in back collision and alleviates whiplash. In a head rest of this kind, it is important how swiftly the head can be received by the support portion in back collision. For that purpose, it is necessary to make the support portion swiftly reach a collision corresponding position. When a time period from bringing about back collision until the head collides with the support portion can be shortened, an amount of moving the head to a rear side is reduced by that amount. Thereby, whiplash disease can further be reduced. As means therefor, for example, it is conceivable to increase a speed of moving the support portion. However, there is a limit to some degree in increasing the speed of moving the support portion. Hence, as a vehicle seat enabling a support portion to be swiftly proximate to the head by improving a locus of moving the support portion, there is U.S. Pat. No. 6,631,955.

According to U.S. Pat. No. 6,631,955, as shown by FIG. 13, a stay 101 of a head rest 100 is inserted into a support 102. As a result of a back collision, the stay 101 is moved to an upper side while being brought into sliding contact with an inner face of the support 102. Thereby, a support portion 105 is moved from an initial position to a collision corresponding position integrally with the stay 101 while maintaining an angle relative to the stay 101. A locus of moving the support portion 105 is defined by a shape of the stay 101 relative to the inner face of the support 102. Specifically, the locus is constituted by a first locus T1 of first moving in a front upper direction to some degree while maintaining an attitude angle of the initial position by the support portion 105, and a second locus T2 of moving to the upper side while being inclined such that an upper portion of the support portion 105 rises out successive to the first locus T1. By defining the first locus T1 in this way, the support portion 105 is made to be proximate to the head of a passenger as swiftly as possible.

However, the support portion 105 tracking the first locus T1 is only moved in the front upper direction while maintaining the attitude angle at the initial position. Therefore, a final point of the first locus T1 does not reach a final collision corresponding position. Thereby, there is a time lag in making the support portion 105 reach the collision corresponding position proximate to the head the most from the final point of the first locus T1. That is, there is a constant distance between a collision point P1 at which the head collides with the support portion 105 in moving on the second locus T2, and a collision point P2 at which the head collides with the support portion 105 at the final collision corresponding position constituting the final point of the second locus T2. Therefore, there is a case in which the head of the passenger collides with the support portion 105 before the support portion 105 reaches the collision corresponding position, and a time period until the head collides with the support portion 105 from bringing about a back collision, is not stabilized. Therefore, also a degree of an injury by whiplash is not stabilized.

Thus, there is a need in the art for a vehicle seat capable of receiving the head at a timing equivalent to that of a final collision corresponding position even in the midst of relatively moving a support portion.

BRIEF SUMMARY OF THE INVENTION

A vehicle seat includes a head rest moving mechanism. The head rest moving mechanism moves a support portion of a head rest relative to a seat back from an initial position to a collision corresponding position in a front upper direction when a vehicle is subjected to a back collision. The support portion moves forwardly and upwardly while inclining forwardly such that an upper portion of the support portion protrude forward, successively, moves forwardly and upwardly while rising such that support portion return to an attitude of the initial position while maintaining a collision point of the support portion and a head of a passenger. 'While maintaining the collision point of the support portion and the head' signifies that in the midst of a relative movement of the support portion, when the support portion once reaches the collision point of the collision corresponding position, thereafter, the collision point in the midst of the relative movement does not move at least in a direction of being remote from the head more than the collision corresponding position, that is, to a rear side or to a lower side. Therefore, the collision point in the midst of the relative movement may be moved in a direction of being proximate to the head more than the collision point of the collision corresponding position, that is, to a front side or to an upper side.

Immediately after bringing about the back collision, by moving the upper portion of the support portion to the upper side while being inclined to the front side to rise to the front side, the collision point with the head in the midst of the relative movement of the support portion can be predominantly made to reach the collision point of the final collision corresponding position. Thereafter, the support portion is moved to the collision corresponding position while maintaining the collision point of the support portion and the head. Thereby, when even in the midst of the relative movement before a total of the support portion reaches the collision corresponding position, the collision point of the support portion and the head is maintained at a constant front upper direction position. Therefore, the support portion can receive the head at a timing equivalent to that of the collision corresponding position even in the midst of the relative movement, and therefore, a time period until the support portion is brought into contact with the head is stabilized. After the support portion reaches the final collision point in the midst of the relative movement, the support portion is moved to the upper side while rising to return to the attitude angle when the support portion is disposed at the initial position. Therefore, at the collision corresponding position, the support portion is brought into the attitude angle substantially similar to that of the initial position. That is, as a result, the support portion is brought into a state in which the support portion is moved in parallel in the front upper direction while maintaining the attitude angle of the initial position. Therefore, the head of the passenger can firmly be received at the collision corresponding position.

The locus of the support portion can be defined by the head rest moving mechanism. For example, the head rest moving mechanism includes a base installed at an upper portion of the seat back, link means for linking the support portion and the base, an engaging pin moved integrally with the support portion for operating an attitude of the support portion in accordance with the relative movement, and a guide path slidably engaged with the engaging pin for guiding to slide the engaging pin in accordance with the relative movement of the support portion. The guide path is a long hole formed at a side face portion of the base. The link means is pivotable centering on a position thereof axially supported by the base. When the vehicle is subjected to the back collision, the link means is pivoted from a lower side in a front upper direction while drawing a locus of a shape of a circular arc bent to the lower side. On the other hand, the guide path is formed in a shape of a circular arc bent to an upper side extended from the initial position in the front upper direction. Thereby, the locus of moving the support portion can efficiently be designed while making the head rest moving mechanism compact.

When the support portion is moved relatively by the link means, the attitude of the support portion is operated by moving the engaging pin engaged with the guide path integrally with the support portion. The engaging pin may be formed integrally with the support portion, or fixed to the support portion. The engaging pin is moved to slide from the initial position to the side of the collision corresponding position along the guide path by receiving the movement of pivoting the link means in the back collision. In this way, the support portion is relatively moved from the initial position to the collision corresponding position in the front upper direction relative to the seat back while defining the locus by the movements of the link means and the engaging pin.

DETAILED DESCRIPTION OF THE INVENTION

Each of the additional features and teachings disclosed above and below may be utilized separately or in conjunction with other features and teachings to provide improved vehicle seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
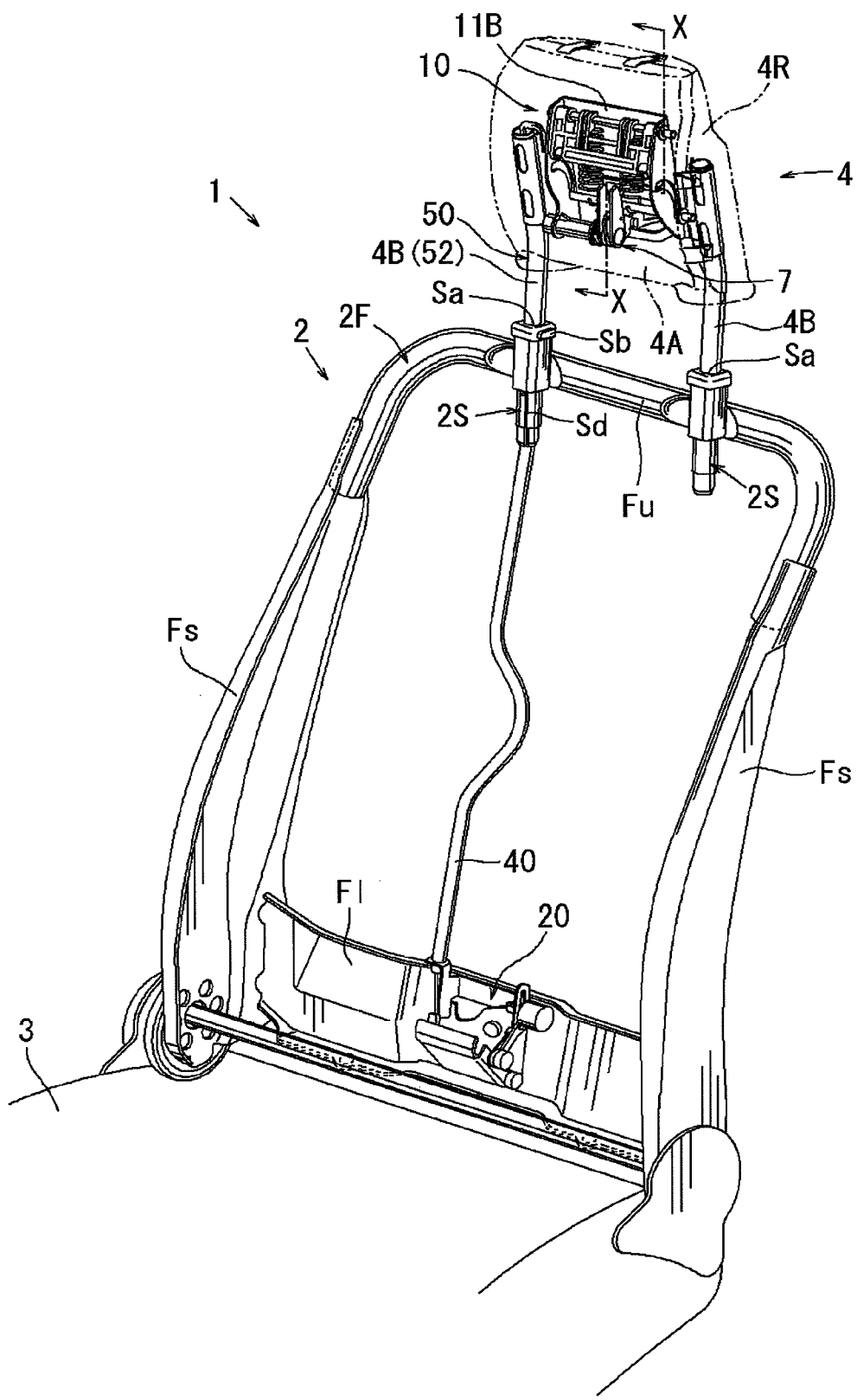
FIG. 1 is a perspective view showing an inner structure of a seat.

A seat 1 is a seat for a vehicle mounted on an automobile. As shown by FIG. 1, the seat 1 is constituted by a seat back 2 constituting a back leaning portion of a passenger, a seat cushion 3 constituting a seating portion, and a head rest 4 for supporting the head of the passenger. Further, in the respective drawings, in order to facilitate to understand a structure of the seat 1, only inner structures of the seat back 2 and the head rest 4 are illustrated.

The head rest 4 is mounted to an upper portion of the seat back 2 by respectively inserting stays 4B, 4B in a rod-like shape to inserting ports Sa, Sa of supports 2S, 2S in a cylindrical shape. Two left and right pieces of the stays 4B are erected at a lower portion of the head rest 4. The supports 2S are provided at two left and right portions of the upper portion of the seat back 2. The supports 2S, 2S are integrally fixed to an upper frame Fu. The upper frame Fu constitutes an upper frame of a back frame 2F constituting a skeleton of the seat back 2. At normal time before a vehicle is subjected to back collision, the head rest 4 is disposed at an initial position of receiving the head from a rear side and a lower side. On the other hand, when the vehicle is subjected to back collision (back face collision), the support portion 4A of the head rest 4 is instantaneously moved to a front side and an upper side. That is, in back collision, the support portion 4A is moved to be proximate to the passenger constituting a seating attitude of floating the physical body from the seat back 2 and the head rest 4 to a front side in a front upper direction up to right behind the back of the head. Thereby, the head can be prevented from being excessively inclined rearward by a momentum of the back collision, and whiplash can be alleviated by alleviating a load applied to the neck portion.

A movement of the support portion 4A in back collision is carried out by a head rest moving mechanism 10 integrated to an inner portion of the head rest 4. The head rest moving mechanism 10 holds the support portion 4A at the initial position on a rear lower side at normal time before back collision (refer to FIGS. 9, 11). On the other hand, in back collision, a state of holding the support portion 4A is released, and the support portion 4A is moved in a front upper direction while drawing a particular locus to the front side and the upper side (refer to FIGS. 11, 12). That is, the head rest moving mechanism 10 moves the support portion 4A to a collision corresponding position proximate to right behind the back of the head while drawing the particular locus. The head rest moving mechanism 10 is made to prevent the support portion 4A from being pushed back to a rear side even when the support portion 4A receives a load of the head in a state in which the support portion 4A is moved up to the collision corresponding position.

The release of the state of holding the support portion 4A is carried out by way of transmitting means connected to a detecting mechanism 20. The detecting mechanism 20 is arranged inside the seat back 2 and detects a load from the passenger in back collision. The transmitting means is constituted by a first cable 40 a lower end of which is connected to the detecting mechanism 20, and a second cable 50 an upper end of which is connected to the head rest moving mechanism 10. An upper end of the first cable 40 and a lower end of the second cable 50 are connected. The first cable 40 is provided inside the seat back 2. The second cable 50 is provided inside the head rest 4.

Figure 2:
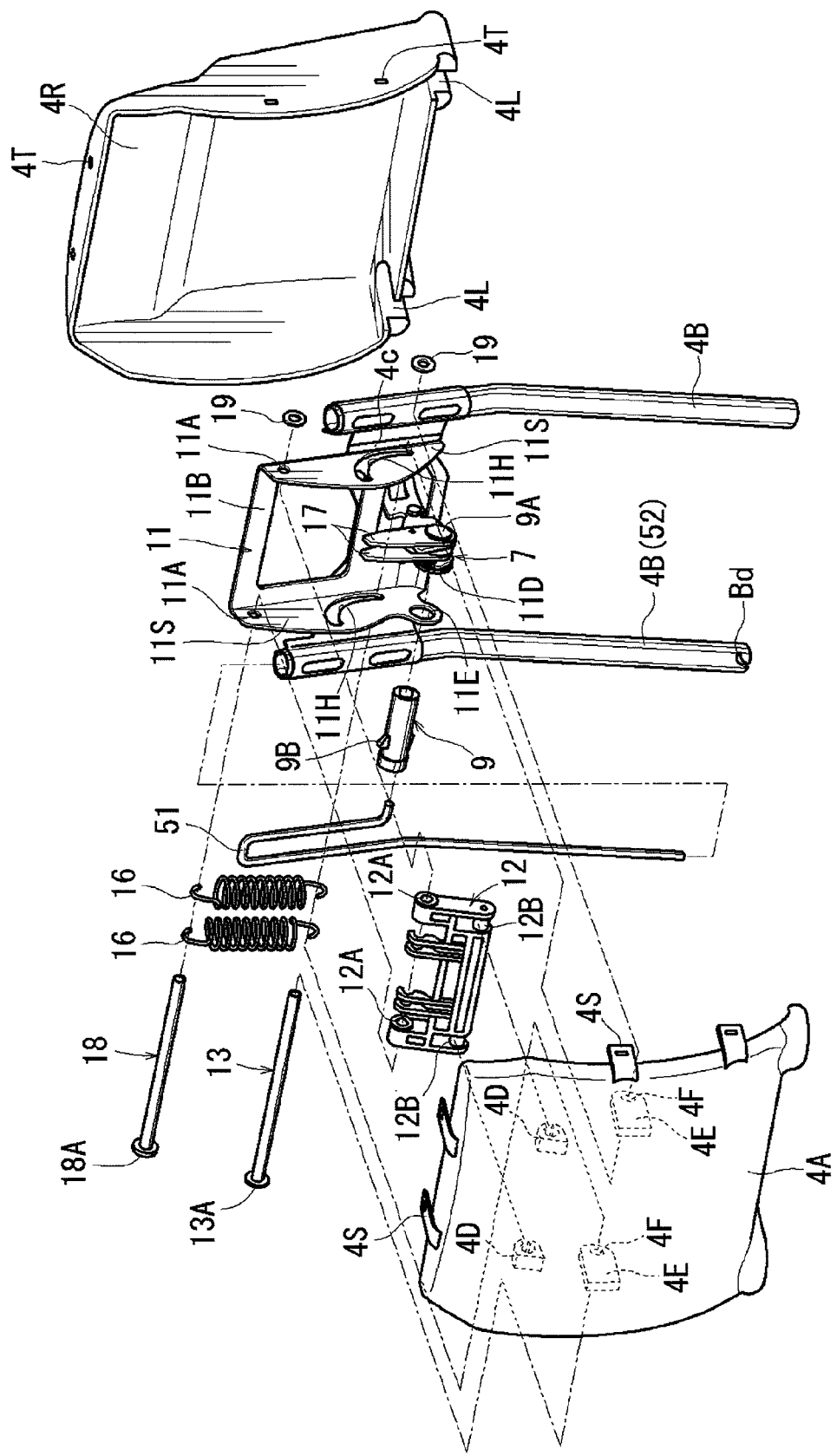
FIG. 2 is a disassembled perspective view of a head rest moving mechanism.
Figure 9:
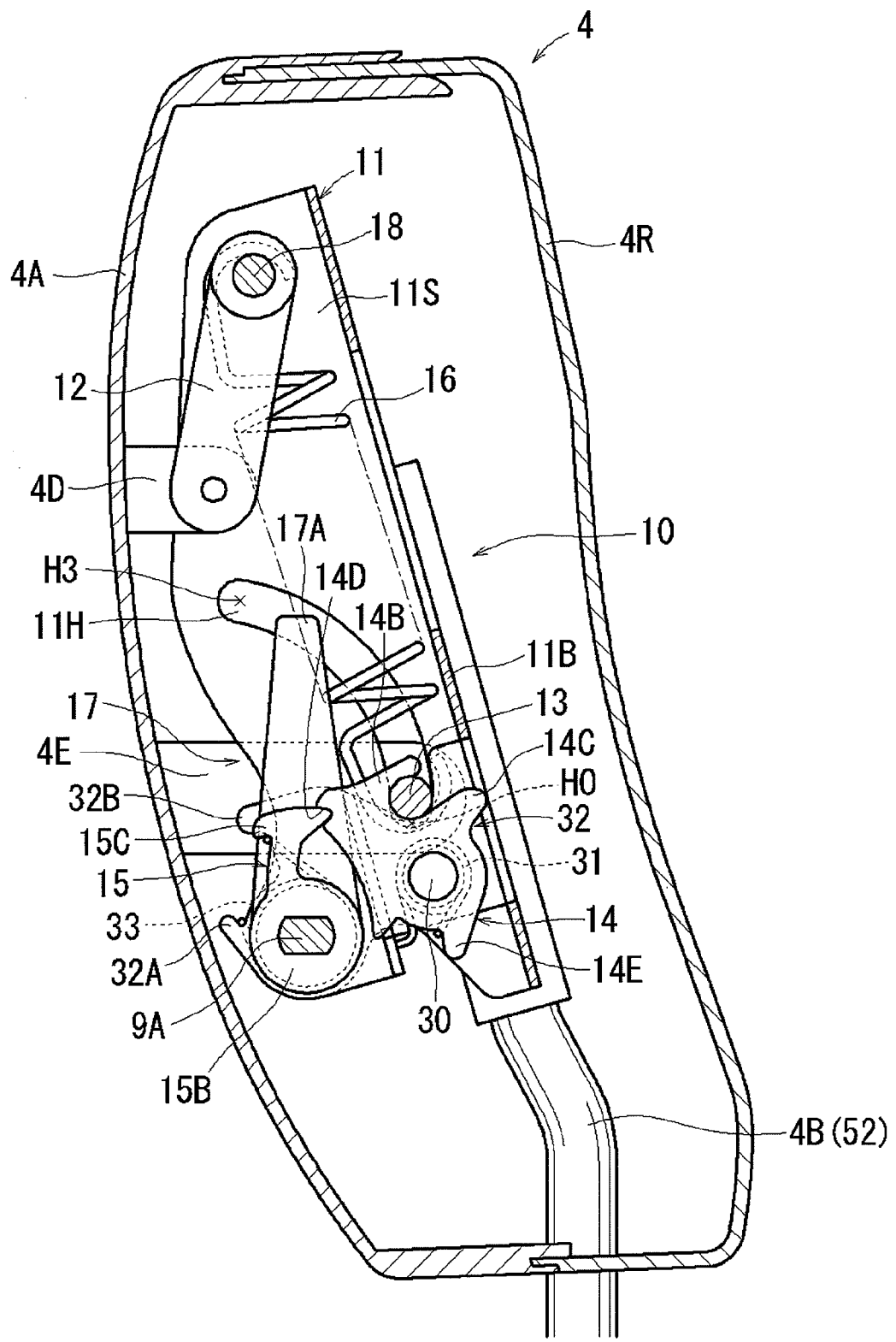
FIG. 9 is a sectional view taken along a line X-X of FIG. 1.

As shown by FIG. 2 and FIG. 9, the head rest moving mechanism 10 includes a base 11 provided at an upper portion of the seat back 2, a link member 12 making the support portion 4A pivotable, an engaging pin 13 operating an attitude of the support portion 4A, a lock mechanism 7 locking the engaging pin 13 at an initial position, a tension spring 16 urging the engaging pin 13, and a restricting plate 17 restricting the engaging pin 13 from moving back to a side of the initial position in vehicle back collision. The base 11 is installed at the upper portion of the seat back 2 by way of the stay 4B. The link member 12 connects the support portion 4A and the base 11 and makes the support portion 4A pivotable centering on an axially supporting position connected to the base 11. The engaging pin 13 is fixedly provided to the support portion 4A and is moved integrally with the support portion 4A. The tension spring 16 always urges the engaging pin 13 to the side of the collision corresponding position. The restricting plate 17 may be referred to also as back moving restricting means.

The base 11 is an integrally formed product made of a synthetic resin. The base 11 integrally includes a rear face portion 11B, a shaft hole ring 11D, and side face portions 11S, 11S in shapes of plates. The shaft hole ring 11D is provided at a position frontward from a lower end of the rear face portion 11B proximate to a side thereof. The side face portions 11S, 11S are respectively extended to a front side from two left and right side edges of the rear face portion 11B. The base 11 is fixed by a screw to a hanging plate 4C hung between the left and right stays 4B, 4B. The stays 4B, 4B are formed in a shape of a hollow tube upper and lower faces of which are opened. An inner member 51 of the second cable 50 is inserted from an upper face opening of the stay 4B on one side (left side of FIG. 2). Both stays 4B, 4B are bent at middle portions in an up and down direction. The two side face portions 11S, 11S are respectively penetrated to be formed with long holes 11H, 11H sliding to guide the engaging pin 13. The long holes 11H, 11H correspond to guide paths of the invention. The long holes 11H, 11H constitute guide paths in a shape of a circular arc extended in a front upper direction and bent to an upper side. Thereby, in accordance with back collision, the support portion 4A can be moved from the initial position to the collision corresponding position relative to the base 11.

The link member 12 is an integrally formed product made of a synthetic resin. The link member 12 connects an upper portion of the base 11 and a rear face of the support portion 4A. The link member 12 is arranged over an interval of the side face portions 11S, 11S. In detail, a connecting shaft 18 is inserted over connecting holes 12A, 12A bored at the link member 12, and connecting holes 11A, 11A respectively bored at the side face portions 11S, 11S. A dimension of the connecting shaft 18 is longer than a left and right width dimension of the base 11. The link member 12 is pivotable by constituting a pivoting center by the connecting shaft 18. The connecting hole 11A and the connecting hole 12A are provided with substantially the same inner diameters. One end of the connecting shaft 18 is integrally formed with a head 18A having a diameter larger than the inner diameter of the connecting hole 12A. The other end of the connecting shaft 18 is provided with a fixing ring 19 having a diameter larger than the inner diameter of the connecting hole 12A. Due to the head 18A and the fixing ring 19, the connecting shaft 18 is prevented from being drawn to detach. Both left and right sides of a front end portion of the link member 12 are respectively formed with strikers 12B, 12B. Both left and right side portions on an upper side of a rear face of the support portion 4A are integrally formed with hook portions 4D, 4D to project to a rear side. By respectively engaging both hook portions 4D, 4D with the strikers 12B, 12B, the link member 12 is pivotably connected to the support portion 4A.

A dimension of the engaging pin 13 is longer than a left and right width dimension of the base 11. The engaging pin 13 is inserted over the long holes 11H, 11H, and connecting holes 4F, 4F. Connecting arms 4E, 4E are formed to project to a rear side at the rear face and a middle portion in an up and down direction of the support portion 4A. The connecting holes 4F, 4F are bored at front end portions of the connecting arms 4E, 4E. The long holes 11H, 11H and the connecting holes 4F, 4F are constituted by substantially the same inner diameters. In the event of a back collision, the connecting arms 4E are moved by constituting a pivoting center by the engaging pin 13 by sliding to move the engaging pin 13 in the long holes 11H. Thereby, the attitude of the support portion 4A is operated. Further, the connecting arms 4E, 4E are disposed respectively on outer sides of the side face portions 11S, 11S. One end of the engaging pin 13 is integrally formed with a head 13A of a diameter larger than an inner diameter of the connecting hole 4F. Other end of the engaging pin 13 is provided with the fixing ring 19 of a diameter larger than the inner diameter of the connecting holes 4F. Due to the head 13A and the fixing ring 19, the engaging pin 13 is prevented from being drawn to detach. The engaging pin 13 is made to be in parallel with the connecting shaft 18. The two left and right tension springs 16, 16 are hung to fix between the engaging pin 13 and the connecting shaft 18. The tension springs 16, 16 urge the engaging pin 13 in a direction pulling the engaging pin 13 to the connecting shaft 18. That is, at normal time, the engaging pin 13 held at lower end portions H0, H0 of the long holes 11H, 11H is always urged to upper end portions H3, H3 of the long holes 11H, 11H.

As shown by FIG. 9, the lock mechanism 7 includes a hook 14 and a lock lever 15. The hook 14 is a holding member to hold the engaging pin 13 at the initial position. The lock lever 15 is an operating member locking a state of holding the engaging pin 13 and releasing the state from being locked. The hook 14 is made of a metal and is formed in a shape of a cam. The hook 14 is integrally formed with an upper jaw 14B and a lower jaw 14C projected in shapes of claws. The hook 14 is made to be pivotable by constituting a pivoting center by a connecting shaft 30 at a portion proximate to a lower end of the base 11. The connecting shaft 30 is wound with a torsional spring 31 in a previously twisted state. The hook 14 is always urged in a direction of being pivoted in the counterclockwise direction (a side of the lock lever 15 on a front side) relative to the base 11 from a state of holding the engaging pin 13 at the initial position (FIG. 9) by the torsional spring 31. One end of the torsional spring 31 is hung to attach to a hanging jaw 14E of the hook 14, and the other end thereof is hung to attach to a hanging plate 32 fixed to the base 11. The hook 14 is recessed to be formed with a locking groove 14D and the locking groove 14D is engaged with an operating arm 15C of the lock lever 15. Thereby, at normal time, the respective hooks 14 are restricted from being pivoted.

The lock lever 15 is also made of a metal. The lock lever 15 is made to be pivotable constituting a pivoting center by a fixing pin 9A. The fixing pin 9A is fitted to a front end of an operating shaft 9. The operating shaft 9 is pivoted by receiving an operating force of the second cable 50. The operating shaft 9 is constituted by a shape of a circular cylinder having a cavity of an oval type constituted by cutting off upper and lower faces of a true circle. The operating shaft 9 is inserted pivotably between a connecting hole 11E bored at a lower end portion of the side face portion 11S on one side and the shaft hole ring 11D. A front end portion of the operating shaft 9 is penetrated from the shaft hole ring 11D to a side of the side face portion 11S on other side. Notation 9B designates a projection preventing the operating shaft 9 from being drawn to detach. The fixing pin 9A is of an oval type. The fixing pin 9A is press-fit into the cavity of the operating shaft 9 by way of the lock lever 15 and the restricting plates 17, 17. Also the lock lever 15 and the restricting plates 17, 17 are respectively bored with inserting holes (not illustrated) of an oval type. The operating shaft 9 and the fixing pin 9A are fitted in a state of inserting the fixing pin 9A into the inserting holes. Thereby, the operating shaft 9, the lock lever 15, and the restricting plates 17 are made to be able to be integrally pivotable centering on the fixing pin 9A.

A torsional spring 33 is arranged between the shaft hole ring 11D and the restricting plate 17. The torsional spring 33 is wound around the operating shaft 9 in a previously twisted state. One end of the torsional spring 33 is hung to attach to a lower jaw 32A of the hanging plate 32, and the other end thereof is hung to attach to an upper jaw 32B of the hanging plate 32. The other end of the torsional spring 33 is hung to penetrate over the restricting plates 17, 17. The other end of the torsional spring 33 is hung to attach to a front edge of the operating arm 15C of the lock lever 15. Thereby, the restricting plates 17, 17 are always urged in a direction of being pivoted in the clockwise direction centering on the fixing pin 9A (operating shaft 9). That is, the restricting plates 17, 17 are always urged in a direction of being intersected with the long holes 11H in a side view thereof. At the same time, the lock lever 15 is always urged in a direction the same as that of the restricting plates 17, 17, that is, to a side of the hook 14. The operating shaft 9 is connected to an upper end of an inner member 51 of the second cable 50. The operating shaft 9 is operated to pivot by an operation in an axial direction by the second cable 50. The hanging plate 32 is formed by a shape of avoiding the long hole 11H, the connecting shaft 30, and the operating shaft 9.

Figure 10:
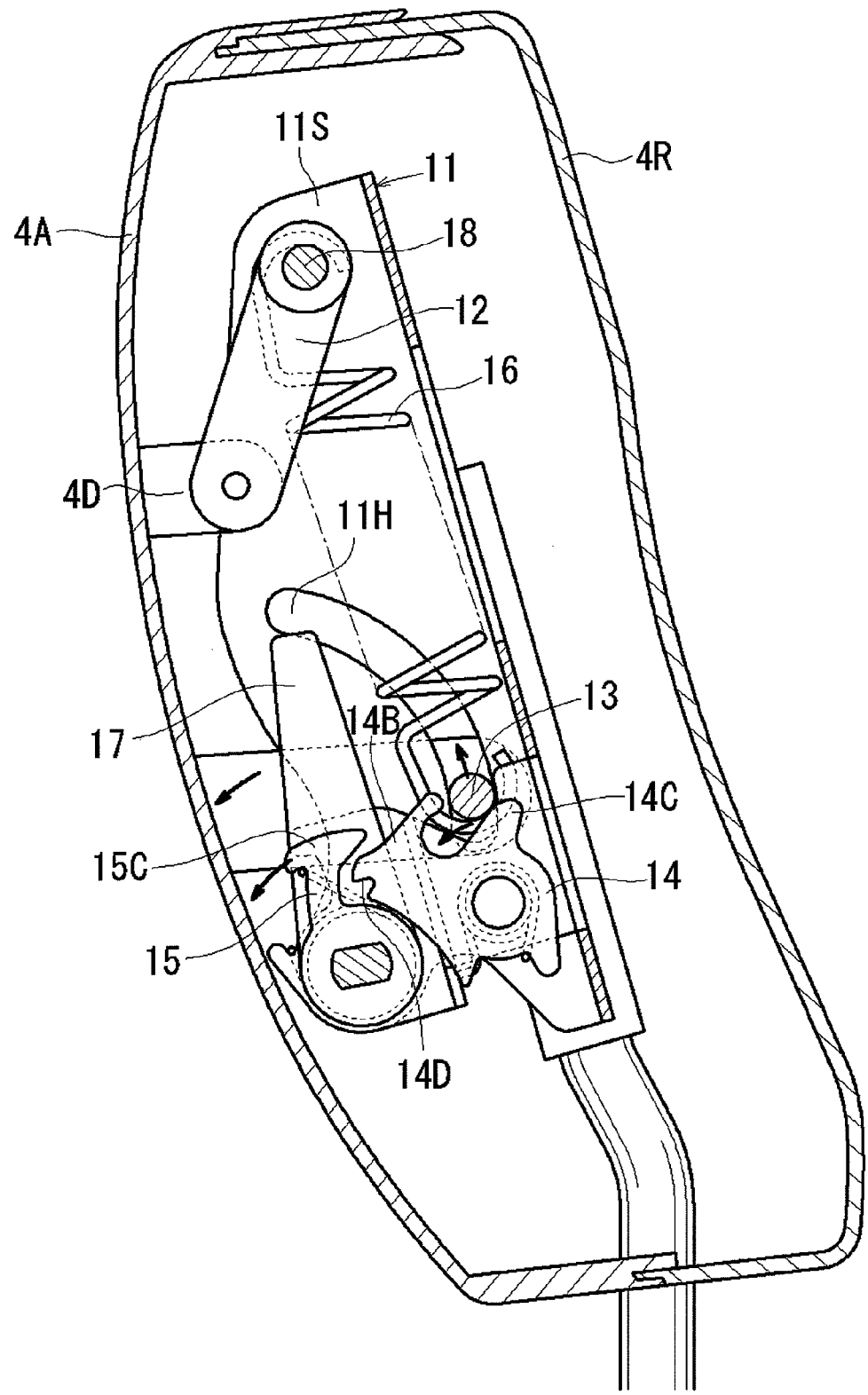
FIG. 10 is a side sectional view of a head rest showing a state of releasing a lock mechanism of holding an engaging pin.

The lock lever 15 is released from being engaged with the hook 14 by being operated to pivot in the counterclockwise direction (a direction of being remote from the hook 14) against the urge force of the torsional spring 33. Thereby, the hook 14 is released from a lock state by the operating arm 15C and is pivoted in the counterclockwise direction (a side of the lock lever 15) along with the lock lever 15. The hook 14 is stopped from being pivoted by being brought into contact with the base portion 15B of the lock lever 15. In the state of locking the hook 14, as shown by FIG. 9, the upper jaw 14B is exposed into the hole of the long hole 11H in a side view thereof. At this occasion, the lower end portion H0 of the long hole 11H is disposed between the upper jaw 14B and the lower jaw 14C. When the hook 14 is pivoted, as shown by FIG. 10, the upper jaw 14B is moved to outside of the hole of the long hole 11H in a side view thereof. At the same time, the lower jaw 14C is exposed into the long hole 11H. When the engaging pin 13 is dropped to the lower end portions H0, H0 of the long holes 11H, 11H, the hook 14 is engaged with the lock lever 15, and the engaging pin 13 is held at the initial position.

In detail, when the engaging pin 13 is dropped to the lower end portions H0, H0, the lower jaw 14C is pressed by the engaging pin 13 and is pushed out to outside of the holes of the long holes 11H, 11H. Thereby, the hook 14 is pivoted in the clockwise direction, and the upper jaw 14B is pivoted from an upper side of the engaging pin 13 into the long holes 11H, 11H. Then, the operating arm 15C is brought to the locking groove 14D, and the hook 14 is locked. Thereby, the engaging pin 13 is squeezed between the upper jaw 14B and the lower jaw 14C, and is held by the lower end portions H0, H0 (initial position). At the same time, the support portion 4A is held at the initial position.

As shown by FIG. 2 and FIG. 9, the pair of restricting plates 17, 17 are metal plates in an elongated shape. The restricting plates 17, 17 reach a vicinity of the upper end portion H3 of the long hole 11H from the fixing pin 9A (operating shaft 9). The restricting plates 17, 17 squeeze the lock lever 15 from both left and right sides. At normal time, the restricting plates 17, 17 are held by an attitude of blocking a slide locus of the engaging pin 13. When the engaging pin 13 is disposed on a lower side (a side of initial position) of the restricting plates 17, 17, the engaging pin 13 is made to be able to move to a side of the collision corresponding position in the long holes 11H, 11H against urge forces of the restricting plates 17, 17. That is, the restricting plates 17, 17 permit the engaging pin 13 to slide to move from the initial position to the side of the collision corresponding position in back collision. On the other hand, the engaging pin 13 is restricted from being moved to slide from the side of the collision corresponding position to the side of the initial position by the restricting plates 17, 17.

As shown by FIG. 2, the support portion 4A is an integrally molded product that can be made of a synthetic resin. The support portion 4A is constituted by a shape of a curved plate, and is provided with a size to efficiently cover the front face of the head rest moving mechanism 10. The rear face of the head rest moving mechanism 10 is covered by a rear face cover 4R. The rear face cover 4R is engaged by respectively engaging four of engaging pieces 4S extended to a rear side integrally from the support portion 4A with four of engaging positions 4T projected to form at the rear face cover 4R. When the head rest moving mechanism 10 is covered by the support portion 4A and the rear face cover 4R, the stays 4B, 4B are contained in long holes 4L, 4L to be able to slide in a front and rear direction. The long holes 4L, 4L are extended in the front and rear direction at a lower face of the rear face cover 4R. Further, numbers and positions of forming the engaging pieces 4S and the engaging projections 4T are not particularly limited so far as the support portion 4A and the rear face cover 4R can firmly be engaged with each other thereby.

Figure 3:
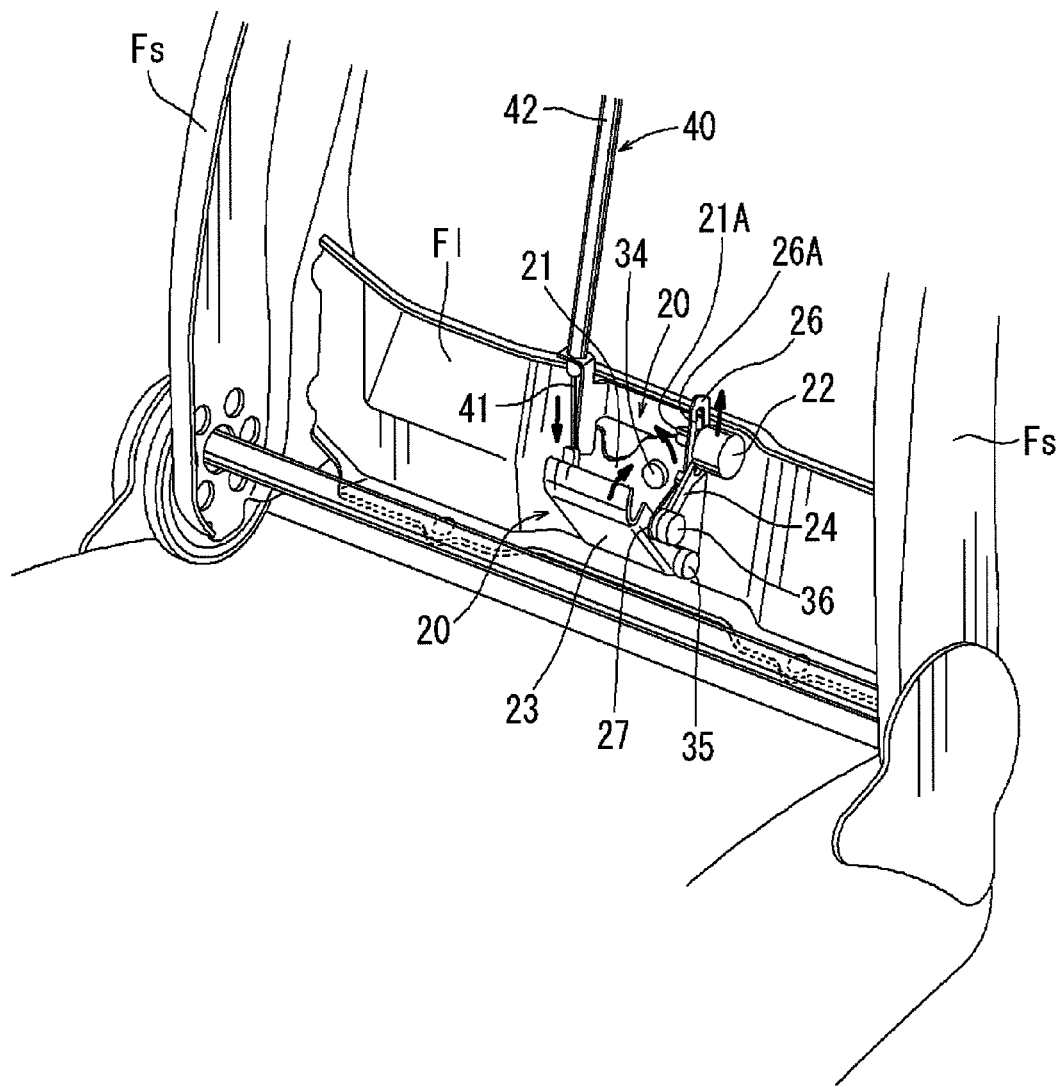
FIG. 3 is a perspective view of a detecting mechanism.

As shown by FIG. 1 and FIG. 3, at an inner portion of the seat back 2, a lower frame F1 is hung over left and right side frames Fs, Fs of the back frame 2F. The lower frame F1 is disposed at a height disposed on a rear side of the waist portion of the passenger. The detecting mechanism 20 is installed at a center portion in the left and right direction of a front face of the lower frame F1. The detecting mechanism 20 includes a release plate 21 operating to pull the first cable 40, an operating pin 22 operating to pivot the release plate 21, a receive plate 23 receiving a load of the passenger, and a link 24 engaged to be attached to between the receive plate 23 and the operating pin 22.

The release plate 21 is axially supported pivotably by a shaft pin 34. Left and right sides of the release plate 21 are pivoted in an up and down direction centering on the shaft pin 34. An inner member 41 of the first cable 40 is connected to one side (left sides of FIG. 1 and FIG. 3) of the release plate 21. The operating pin 22 is inserted into a long hole 26A of a support plate 26 to be able to slide in an up and down direction. The support plate 26 is fixed to a front face of the lower frame F1. The long hole 26A is bored to be vertically prolonged in the up and down direction of an upper portion of the support plate 26. The receive plate 23 is axially supported pivotably in the front and rear direction by constituting a pivoting center by the shaft pin 35. The shaft pin 35 is inserted to be fixed to a lower portion of the support plate 26. The link 24 is pivotably connected to the shaft pin 36 and the operating pin 22. The shaft pin 36 is inserted to be fixed to an upper portion of a side face of the receive plate 23. A tension spring (not illustrated) is hung between other side (right sides of FIG. 1 and FIG. 3) of the release plate 21 and the shaft pin 35. Other side of the release plate 21 is always urged to a lower portion by the tension spring. Thereby, one side (left side) of the release plate 21 is always urged to an upper side. The shaft pin 36 is wound with a torsional spring 27. One end of the torsional spring 27 is hung to attach to the shaft pin 35, and other end thereof is hung to attach to the link 24. The receive plate 23 is always urged to the front side by the torsional spring 27. Thereby, at normal time, the receive plate 23 is held in an attitude of being inclined to a front side from the lower frame F1. At the same time, the operating pin 22 which is engaged with the link 24 is disposed at a lower end of a long hole 26A at normal time. At this occasion, a front end of the operating pin 22 is brought into contact with a projected piece 21A. The projected pin 21A is projected to the front side from an upper edge on other side (right side) of the release plate 21.

Figure 4:
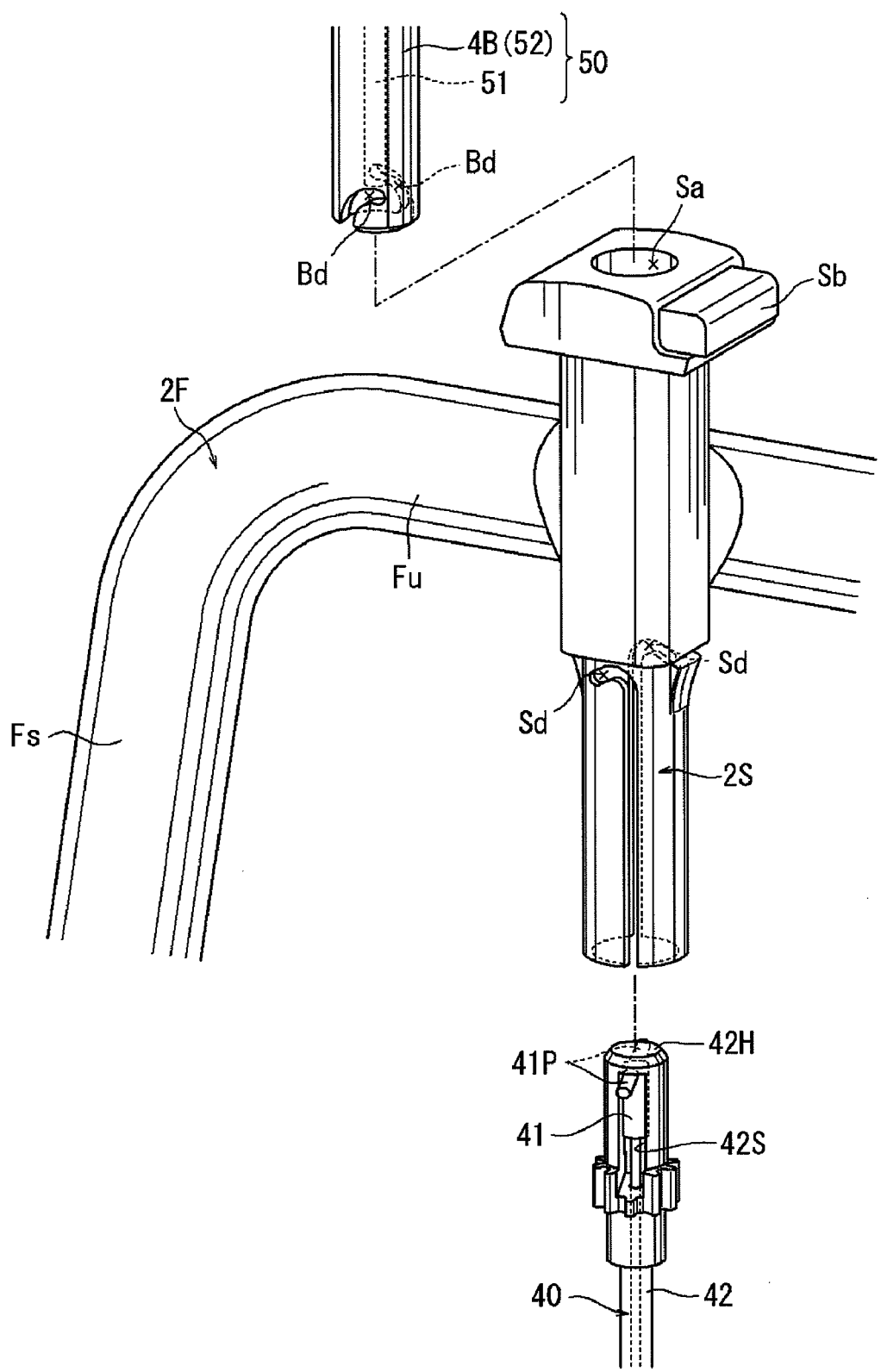
FIG. 4 is a disassembled perspective view of a structure of connecting a first cable and a second cable.

As shown by FIG. 4, the first cable 40 and the second cable 50 are connected at an insert connecting portion at which the stay 4B on the left side is inserted to the support 2S. According to a structure of connecting the first cable 40 and the second cable 50, by inserting and drawing the stay 4B on the left side to and from the support 2S, the stay 4B and the support 2S can be connected to each other or separated from each other. Thereby, an operation of attaching and detaching the head rest 4 to and from the seat back 2 is enabled.

The first cable 40 is constituted by a double structure of inserting the inner member 41 in a line-like shape into the outer member 42 in a tube-like shape. An upper end portion of the inner member 41 is formed with an engaging projection 41P in a shape of a character T projected to an outer side in a diameter direction. An upper end portion of the outer member 42 is formed with long holes 42S, 42S of respectively projecting both ends of the engaging projection 41P to outer sides in the diameter direction. The long holes 42S, 42S are prolonged in an axial direction and are formed at the outer member 42. The engaging projection 41P is movable in the axial direction in the long holes 42S, 42S to permit a relative movement in the axial direction of the inner member 41. An upper end portion of the outer member 42 is formed with a head 42H.

As shown by FIG. 4, the support 2S on the left side is formed with inserting grooves Sd extended from a lower end to an upper side at two portions in an axis symmetry. When a connecting end portion of the first cable 40 is inserted from a lower side into an inserting port Sa of the support 2S, the respective inserting grooves Sd respectively receive both ends of the engaging projections 41P. Terminal end portions of the two inserting grooves Sd, Sd are bent respectively in a peripheral direction in a state of constituting an axis symmetry by each other. When the engaging projections 41P reach the terminal end portions of the inserting grooves Sd, Sd, by pivoting the first cable 40 in the peripheral direction, the engaging projections 41P can be inserted to the terminal end portions of the inserting grooves Sd, Sd (refer to FIG. 5). Thereby, the first cable 40 is held in a state of being hung down from the support 2S. A portion of the outer end portion of the outer member 42 is bulged to an outer side in the diameter direction. The bulged portion coincides with the inner diameter of the inserting port Sa. An outer peripheral face of the bulged portion is formed with a serration. Thereby, the outer member 42 is moved smoothly in the axial direction at inside of the inserting port Sa. When the inner member 41 is pulled to a lower side by the release plate 21, the inner member 41 is drawn out from the outer member 42. Both of the inner member 41 and the outer member 42 are provided with a flexibility, as shown by FIG. 1, the first cable 40 is bent to avoid various structures (not illustrated) of an air conditioner and the like arranged in the seat back 2.

Figure 5:
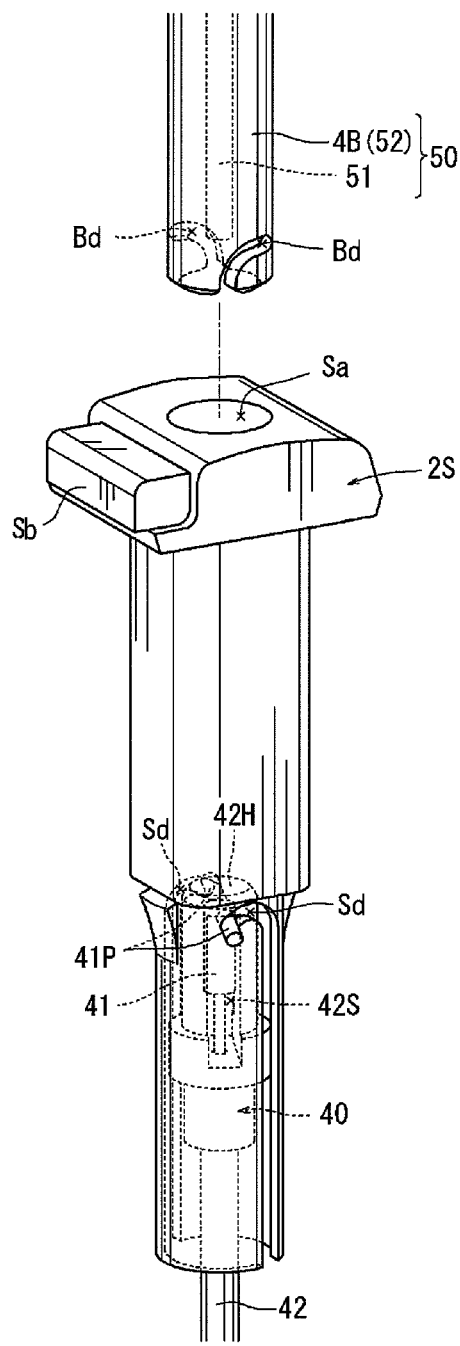
FIG. 5 is a perspective view of a state before inserting a stay of a head rest to a support installed at a seat back.
Figure 6:
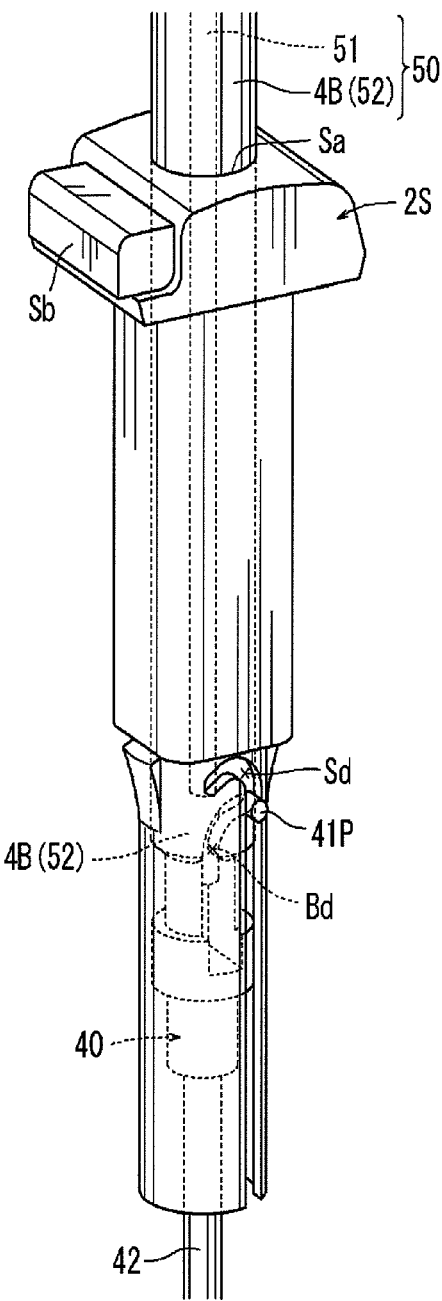
FIG. 6 is a perspective view of a state of inserting the stay of the head rest to the support installed at the seat back.

The second cable 50 is constituted by a double structure of inserting an inner member 51 in a rod-like shape having a comparatively high rigidity through an outer member 52. Actually, the stay 4B serves as the outer member 52 (refer to FIG. 1, FIG. 2). In the following, an explanation will be given by constituting the outer member 52 by the stay 4B. As shown by FIG. 4 and FIG. 5, the inner member 51 is held in a state of being hung down at inside of the stay 4B. A peripheral wall of the stay 4B is formed with receiving grooves Bd, Bd extended from a lower end to an upper side at two portions in an axis symmetry. When the stay 4B is inserted to the support 2S from an upper side, as shown by FIG. 6, the head 42H of the first cable 40 is received in the stay 4B. Successively, the receiving grooves Bd, Bd respectively receive both ends of the engaging projections 41P of the first cable 40.

As shown by FIG. 4 and FIG. 5, terminal end portions of the both receiving grooves Bd, Bd are respectively bent in a peripheral direction in a state of constituting an axis symmetry by each other. The terminal end portions of the receiving grooves Bd, Bd are bent to an inverse side in the peripheral direction relative to the terminal end portions of the inserting grooves Sd, Sd. When the stay 4B is inserted to the support 2S, as shown by FIG. 6, the engaging projections 41P are pushed back from terminal end portions of the inserting grooves Sd while being guided by the shapes of the receiving grooves Bd, and are finally moved to terminal end portions of the receiving grooves Bd, Bd. Thereby, although the engaging projections 41P are relatively movable in the axial direction relative to the support 2S, a movement thereof relative to the stay 4B is restricted. Thereby, the first cable 40 and the second cable 50 are connected.

Figures 7, 8:
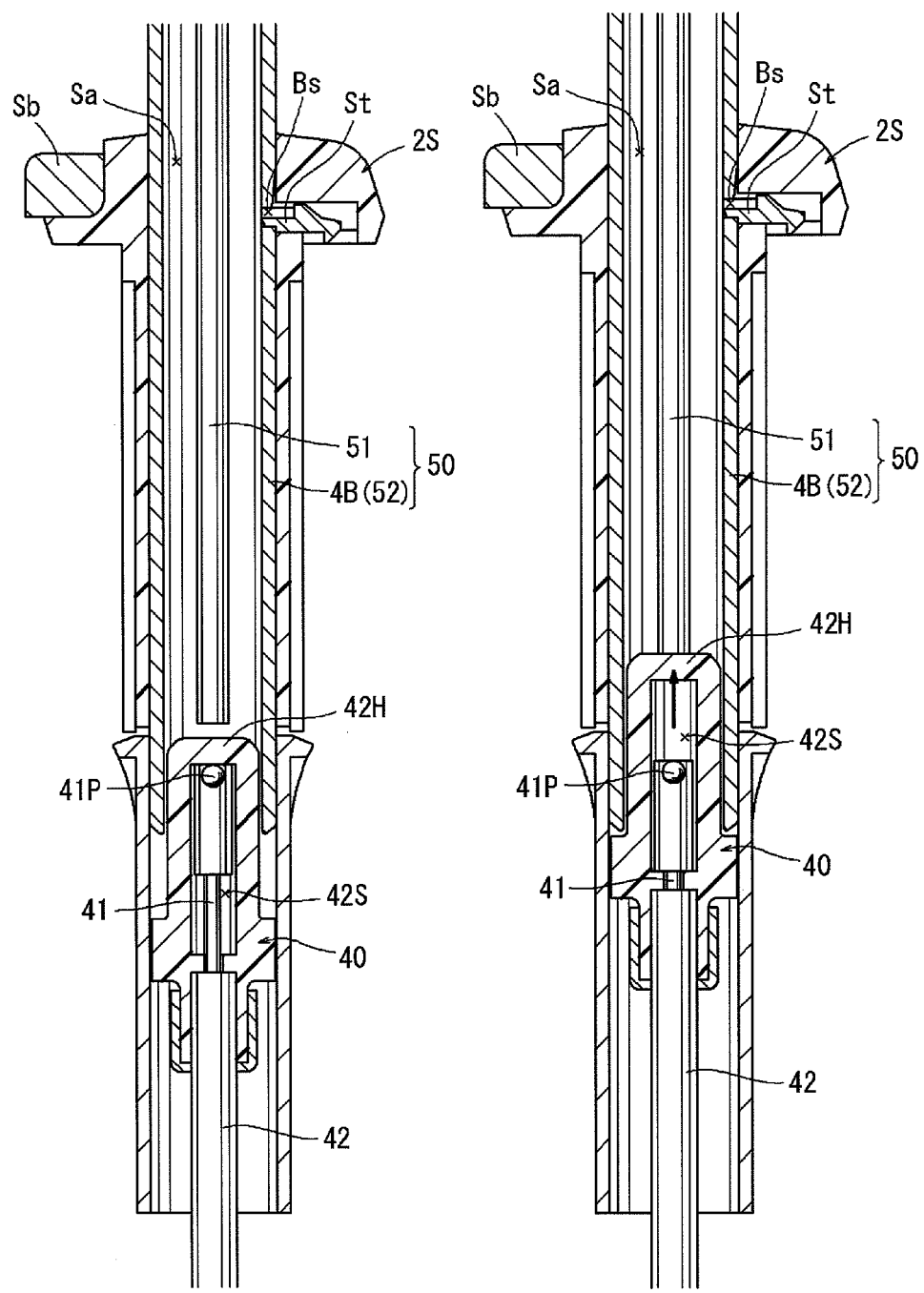
FIG. 7 is a vertically sectional front view showing the structure of connecting the first cable and the second cable.
FIG. 8 is a vertically sectional front view showing a state of operating to pull the first cable from the state of FIG. 7.

Even in the axially connected state, the stay 4B can further be inserted. Therefore, as shown by FIG. 7, while maintaining the axially connecting state, the stay 4B can be inserted up to a position of being locked by the support 2S. The stay 4B on the left side is formed with a locking groove Bs notched in a recessed shape. The support 2S on the left side is provided with a locking claw St. The locking claw St is always urged to inside of the inserting port Sa and projected to inside of the inserting port Sa at normal time. By laterally pressing a knob Sb, the locking claw St is pushed to outside of the inserting port Sa. By inserting the stay 4B into the inserting port Sa in a state of pressing the knob Sb, the locking claw St is automatically fitted to the locking groove Bs. Thereby, a height position of the stay 4B can be locked. The locking grooves Bs are formed at a plurality of positions in the axial direction of the stay 4B. Similarly, the head rest 4 can be detached from the seat back 2 by drawing the stays 4B, 4B from the supports 2S, 2S while pushing the knobs Sb. By pulling to move the stays 4B, 4B, the engaging projections 41P are moved from the receiving grooves Bd, Bd to the inserting grooves Sd, Sd by a movement reverse to the above-described, and connection of the first cable 40 and the stay 4B is released.

When the inner member 41 of the first cable 40 is pulled to the lower side, as shown by FIG. 8, the outer member 42 of the second cable 50 is pressed to move relatively to the upper side. Thereby, the inner member 51 of the second cable 50 is pressed up from a lower side by the head 42H of the outer member 42 while maintaining the state of connecting the stay 4B and the inner member 41. When the inner member 51 is pressed up, the operating shaft 9 is pivoted. Thereby, the state of holding the support portion 4A disposed at the initial position is released.

Next, an operation of the embodiment will be explained. As shown by FIG. 1, at normal time, the support portion 4A of the head rest 4 is held at the initial position. When the vehicle is subjected to back collision, the load pressed by the passenger is applied to the seat back 2. Then, as shown by FIG. 3, the receive plate 23 of the detecting mechanism 20 is pushed to move to the rear side. Then, by the link 24 connecting with the receive plate 23, the operating pin 22 is moved to the upper side at inside of the long hole 26A. Then, the operating pin 22 pushes up the projected piece 21A to the upper side, and a left side of the release plate 21 is pivoted to the lower side. Thereby, the inner member 41 of the first cable 40 is pulled. Further, when the operating pin 22 is moved to the upper end of the long hole 26A, the contact of the operating pin 22 and the projected piece 21A is released. Thereby, the release plate 21 returns to the initial position by the urge force of the tension spring. Therefore, only a short period of time is taken by pulling the inner member 41. The operating pin 22 moved to the upper side of the projected piece 21A moves around the front side of the projected piece 21A by the urge force of the torsional spring 27, and is returned to the position of being brought into contact with a lower face of the projected piece 21A again. At the same time, also the receiving plate 23 is returned to the initial attitude.

When the inner member 41 is pulled to the lower side, as shown by FIG. 8, the outer member 42 is pushed up to the upper side relatively. Thereby, the inner member 51 of the second cable 50 is pushed up by the head 42H of the outer member 42. In accordance therewith, the operating shaft 9 is pivoted, and the state of locking the support portion 4A is released. In detail, the operating shaft 9 is axially pivoted in the counter clockwise direction from the initial attitude shown in FIG. 9. Thereby, as shown by FIG. 10, also the lock lever 15 is pivoted in the direction of being remote from the hook 14 along with the operating shaft 9. At the same time, also the restricting plates 17, 17 are pivoted in a direction of being deviated from the locus of sliding the engaging pin 13 along with the lock lever 15. Further, according to the embodiment, the lock lever 15 and the restricting plates 17, 17 are pivoted from the initial attitude shown in FIG. 9 by about 20° at maximum. When the lock lever 15 is pivoted, the engagement of the operating arm 15C and the locking groove 14D is released. Thereby, the state of locking the hook 14 is released. Then, also the hook 14 is pivoted in the counter-clockwise direction, and the state of locking the engaging pin 13 by the hook 14 is released. A pivoting limit of the hook 14 is defined by bringing the hook 14 into contact with the base portion 15B of the lock lever 15.

Figure 11:
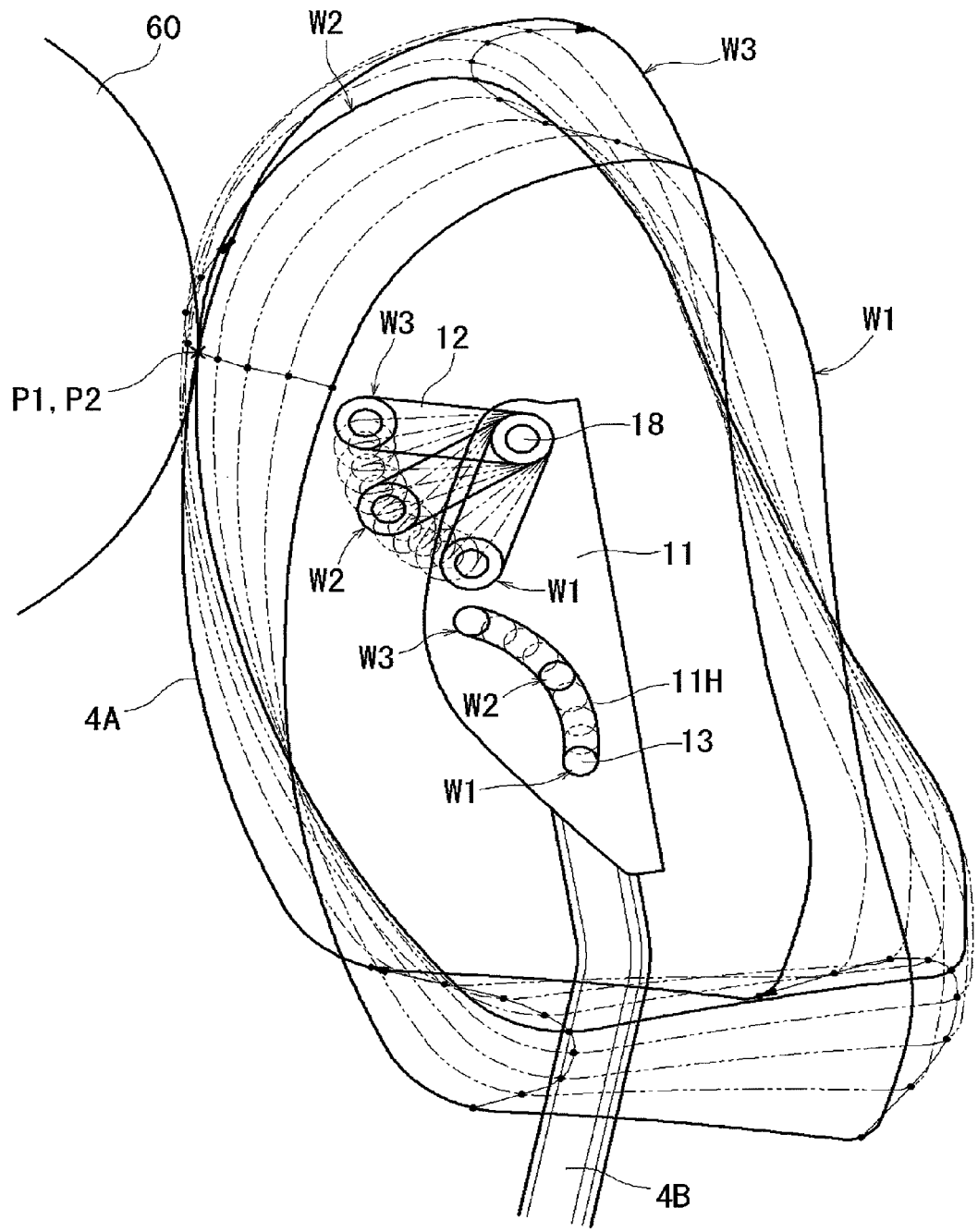
FIG. 11 is an outline constitution view showing a locus of moving a support portion.

When the state of locking the engaging pin 13 is released, as shown by FIG. 11, by an urge force of the tension spring 16, the engaging pin 13 is slid to the upper end portions H3, H3 along the long holes 11H, 11H. In accordance therewith, the support portion 4A is moved from the initial position relatively in the front upper direction while being accompanied by pivoting of the link member 12 and moving of the connecting arm 4E. Finally, the support portion 4A is moved to the collision corresponding position proximate to the head of the passenger. Further, also a time period of pushing up the inner member 51 of the second cable 50 to the upper side is short. Therefore, during a time period of sliding the engaging pin 13 to the upper side, the restricting plates 17, 17 are pivoted in the direction of blocking the locus of sliding the engaging pin 13 again by the urge force of the torsional spring 33. At the same time, also the lock lever 15 is pivoted in the direction of being brought into contact with the hook 14. The urge force of the tension spring 16 of urging the engaging pin 13 to the upper side is stronger than the urge force of the torsional spring 33 of urging the restricting plates 17, 17 to the side of the initial position. Therefore, even when the restricting plates 17, 17 are returned to the attitude of blocking the locus of sliding the engaging pin 13 before the engaging pin 13 reaches the upper end portions H3, H3 of the long holes 11H, 11H, the engaging pin 13 can push back the restricting plates 17, 17 against the urge force of the torsional spring 33.

A detailed explanation will be given of a relative movement locus of the support portion 4A in reference to FIG. 11. Further, in FIG. 11, in order to illustrate the locus of moving the support portion 4A to be easy to understand, the constitution of the head rest moving mechanism 10 or the like is simplified. A state in which the support portion 4A is disposed at an initial position W1, a state in which the support portion 4A reaches a final collision point P2 in a relative movement, and a state in which the support portion 4A is disposed at a collision corresponding position W3 are indicated by bold lines. Other states in the midst of movement are indicated by the dotted lines. By a slender bold line, a locus of a characteristic point of the support portion 4A is drawn. With regard to the head 60 of the passenger, a position of being moved to the rear side by back collision is indicated. As shown by FIG. 9, when the support portion 4A is disposed at the initial position W1, the link member 12 is directed in the lower direction. When the state of locking the engaging pin 13 is released, as shown by FIG. 11, the engaging pin 13 is moved to slide in the front upper direction while tracking the locus in the shape of the circular arc bent to the upper side. At the same time, the link member 12 is pivoted in the front upper direction while tracking the locus in the shape of the circular arc bent to the lower side. The link member 12 is pivoted centering on the connecting shaft 18 connected to the base 11. In this way, the loci of moving the link member 12 and the engaging pin 13 are constituted by shapes bent to the upper side and the lower side opposed to each other, thereby, the support portion 4A is moved to the collision corresponding position W3 in the front upper direction while tracking a unique locus as shown by FIG. 11.

Specifically, immediate after collision, the support portion 4A is moved to the upper side while inclining the upper portion of the support portion 4A to the front side to rise to the front side. Thereby, even in the midst of the relative movement of the support portion 4A, a collision point P1 with the head 60 at the corresponding position W2 reaches the collision point P2 of the final collision corresponding position W3. Thereafter, the support portion 4A is moved to the collision corresponding position W3 while maintaining the collision point P1 of the support portion 4A and the head 60 in the midst of relative movement. In details, the support portion 4A is moved up to the collision corresponding position W3 without returning to the rear side or the lower side of the collision point P2. In moving to the collision corresponding position W3, the support portion 4A is moved while rising to return to an attitude angle when the support portion 4A is disposed at the initial position W1. That is, the support portion 4A reaching the collision point P2 once in the midst of the relative movement is moved by an attitude of tracing the collision point P2 thereafter. In this way, even when the support portion 4A per se does not reach the collision corresponding position W3, the collision point P1 of the support portion 4A and the head 60 is maintained at the position of the collision point P2 of the collision corresponding position W3, and therefore, even when the support portion 4A is disposed at W2 in the midst of the relative movement, the head 60 can be received by a timing equivalent to that of the collision corresponding position W3. Further, at the collision corresponding position W3, the support portion 4A is brought into an attitude substantially similar to that of the initial position W1, and therefore, as a result, the support portion 4A is brought into a state of being moved in parallel in the front upper direction while substantially maintaining the attitude of the initial position W1. Thereby, at the collision corresponding position W3, the head 60 can firmly be received.

Figure 12:
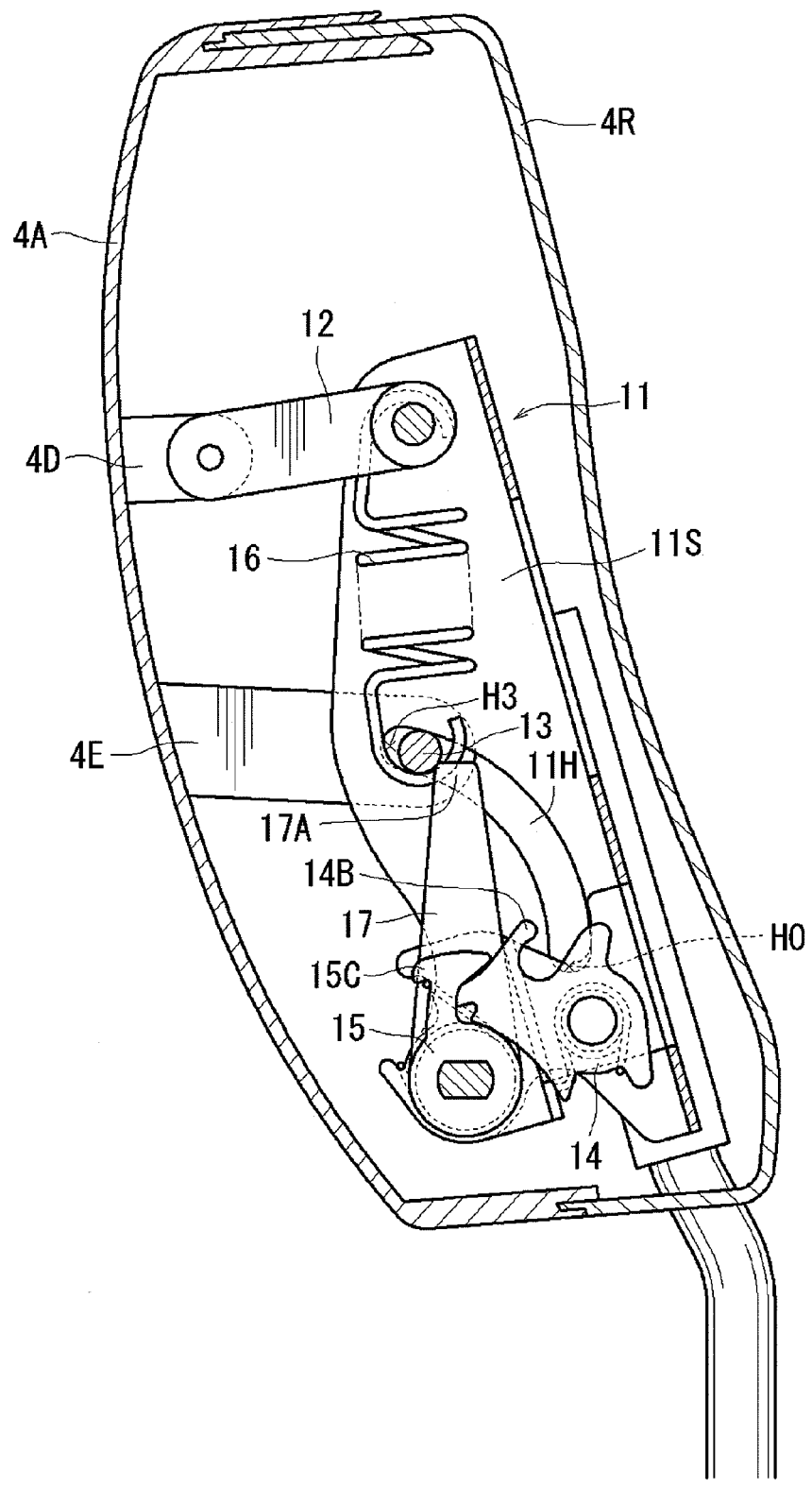
FIG. 12 is a side sectional view of a head rest showing a state in which the head rest is disposed at a collision corresponding position.
Figure 13:
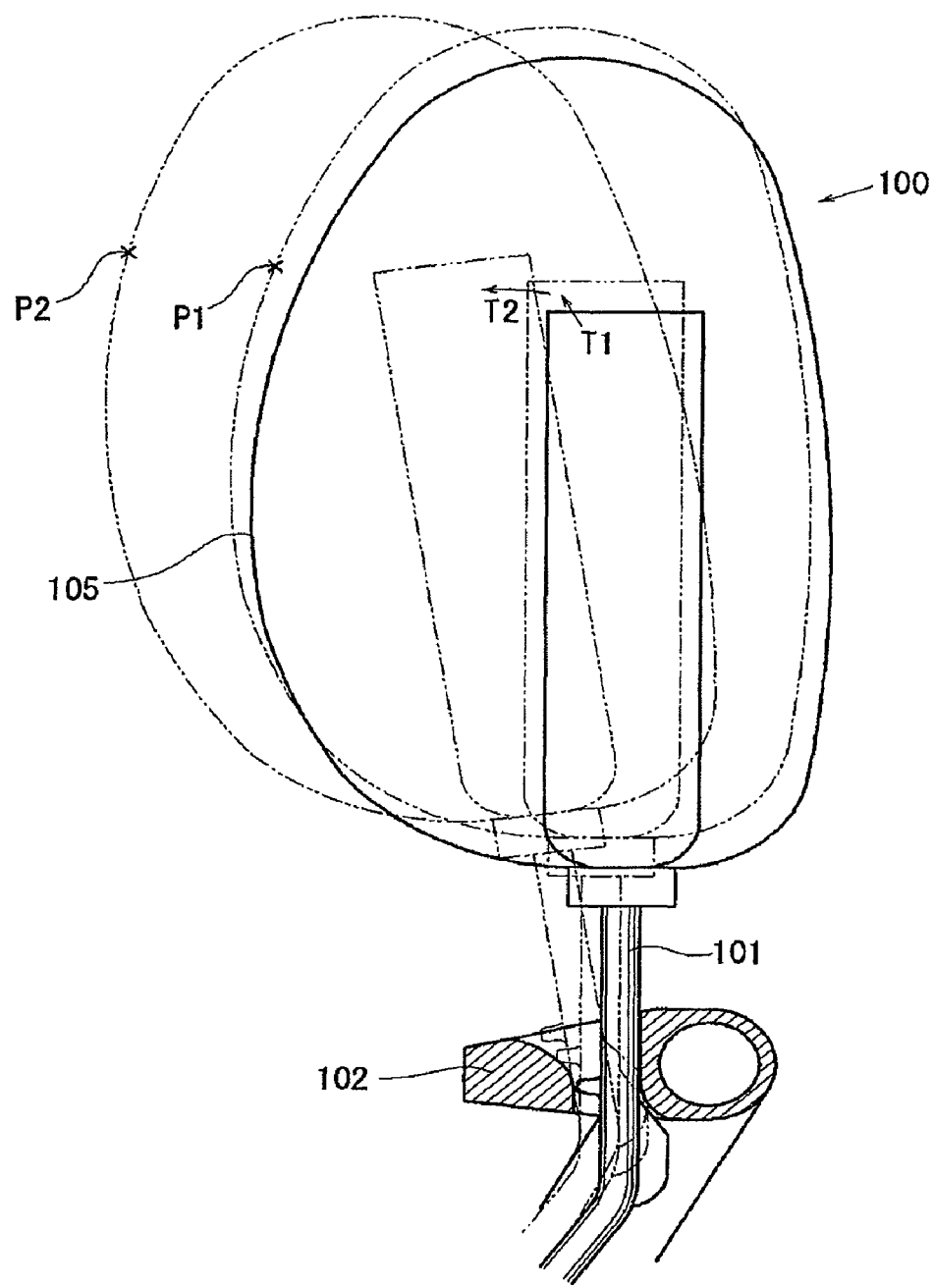
FIG. 13 is an outline constitution view showing a locus of moving a support portion of a head rest of a background art.

As shown by FIG. 12, when the engaging pin 13 reaches the upper end portions H3, H3 of the long holes 11H, 11H, the restricting plates 17, 17 advance into the long holes 11H, 11H. That is, the locus of the engaging pin 13 is blocked by the restricting plates 17, 17. Thereby, the engaging pins 13 disposed at the upper end portions H3, H3 are brought into contact with upper faces 17A of the restricting plates 17, 17 to restrict the engaging pin 13 from returning back to the side of the lower end portions H0, H0. At this occasion, although the restricting plates 17, 17 are operated with a press force in a lower rear direction from the engaging pin 13, the operating arm 15C of the lock lever 15 is brought into contact with the upper jaw 14B of the hook 14, and therefore, the restricting plates 17, 17 are not pivoted to the rear side. Thereby, even when the head contacts the head rest 4 as a result of a back collision, the support portion 4A is firmly held at the collision corresponding position.

Modified Example

The head rest moving mechanism is not limited to the above-described constitution so far as the head rest moving mechanism is constituted by a mechanism including the base installed at the seat back, the link means of linking the support portion and the base, the engaging pin moved integrally with the support portion for operating the attitude of the support portion in accordance with the relative movement, and the guide path of sliding to guide the engaging pin in accordance with the relative movement of the support portion. That is, a publicly-known head rest moving mechanism can also be adopted so far as the head rest moving mechanism includes the above-described mechanism.

For example, a number of pieces of installing the restricting plates 17 are not particularly limited but may be one sheet, or 3 sheets or more. The engaging pin 13 is not limited to the independent rod member inserted to the long hole 11H. The engaging pin 13 may be formed integrally with the connecting arm 4E of the support portion 4A. As the mechanism of relatively moving the support portion 4A from the initial position to the collision corresponding position in back collision, a slide mechanism or a hinge mechanism can also be adopted.

As a slide mechanism, for example, there is pointed out a mechanism of boring one piece or a plurality of pieces of long holes (slide holes) extended in a direction of a relative movement of a support portion at either one of the support portion or a base, and fitting a slide pin fixedly provided to other of the support portion and the base slidably in the long hole. Further, the long hole of the slide mechanism is provided as a mechanism separate from the long hole 11H constituting a guide path. Further, as a hinge mechanism, for example, the hinge mechanism may also be provided between a stay of a head rest and a frame of a seat back. A locus of a relative movement of the support portion may be defined by shapes of the slide mechanism or the hinge mechanism and the long hole 11H constituting the guide path.

The invention claimed is:

1. A vehicle seat, comprising:
   a head rest moving mechanism to move a support portion of a head rest relative to a seat back when a vehicle is subjected to a back collision,
   the head rest moving mechanism including:
   a base provided at an upper portion of the seat back;
   a link connected to the support portion and the base for linking the support portion and the base;
   an engaging pin that is fixedly provided with the support portion and is configured to move integrally with the support portion and to control an attitude of the support portion in accordance with a relative movement of the support portion; and
   a guide path provided along the base and having an elongated slot for slidably guiding the engaging pin in accordance with the relative movement of the support portion,
   wherein the head rest moving mechanism moves the support portion from an initial position to a collision corresponding position in a front upper direction relative to the seat back, and
   wherein when the support portion moves in the front upper direction to the collision corresponding position, the support portion returns to an initial position attitude while maintaining a collision point between the support portion and a head of a passenger.

2. The vehicle seat according to claim 1,
   wherein the guide path is a circular arc that bends from a lower side of the base towards an upper side of the base,
   wherein the elongated slot is formed at a side face portion of the base,
   wherein the link is pivotable about an axially supporting position of the base, and
   wherein when the back collision occurs, the link pivots in the front upper direction along a locus of pivot points defined as a circular arc that bends from the upper side of the base towards the lower side of the base.

3. The vehicle seat according to claim 2, wherein when the support portion is disposed at the collision corresponding position, an upward and forward movement of the support portion from the initial position is defined.

4. The vehicle seat according to claim 3, wherein the head rest moving mechanism is configured to lock the support portion at the initial position;
   wherein a detecting mechanism to detect a load of the passenger in the back collision is provided in the seat back;
   wherein the head rest moving mechanism and the detecting mechanism are connected to each other; and
   wherein when the back collision occurs, the support portion is unlocked by an operation of the head rest moving mechanism and the detecting mechanism.

* * * * *